United States Patent
Mottera Srinivas

(10) Patent No.: US 12,404,911 B1
(45) Date of Patent: Sep. 2, 2025

(54) TURBOSHAFT ENGINE POWERED QUADROTOR DRONE

(71) Applicant: Samanth Mottera Srinivas, Bengaluru (IN)

(72) Inventor: Samanth Mottera Srinivas, Bengaluru (IN)

(*) Notice: Subject to any disclaimer, the term of this patent is extended or adjusted under 35 U.S.C. 154(b) by 0 days.

(21) Appl. No.: 18/971,626

(22) Filed: Dec. 6, 2024

(51) Int. Cl.
  *B64U 10/14* (2023.01)
  *F16H 1/22* (2006.01)
  *F16H 55/36* (2006.01)
  *F16H 57/02* (2012.01)

(52) U.S. Cl.
  CPC ............ *F16H 1/222* (2013.01); *B64U 10/14* (2023.01); *F16H 55/36* (2013.01); *F16H 2057/02043* (2013.01)

(58) Field of Classification Search
  CPC ................. F16H 1/222; F16H 55/36; F16H 2057/02043; B64U 10/14
  See application file for complete search history.

(56) References Cited

U.S. PATENT DOCUMENTS

| | | |
|---|---|---|
| 3,115,936 A | 12/1963 | Blews |
| 7,866,598 B2 | 1/2011 | Waide et al. |
| 7,965,007 B2 | 6/2011 | Dahlen |
| 9,139,298 B2 | 9/2015 | Gates et al. |
| 10,343,770 B2 | 7/2019 | Mullins |
| 11,345,469 B2 | 5/2022 | McDonald et al. |
| 11,673,676 B2 | 6/2023 | Neff |
| 11,827,348 B2 | 11/2023 | Acikel |
| 2013/0231208 A1* | 9/2013 | Buono ............... B64D 27/34, 475/5 |
| 2018/0030887 A1* | 2/2018 | Zhao ............... F16H 7/02 |
| 2018/0244377 A1* | 8/2018 | Chan ............... B64C 27/12 |
| 2018/0290735 A1* | 10/2018 | Uptigrove ........... B64C 29/0025 |
| 2019/0337607 A1 | 11/2019 | Lee et al. |
| 2020/0115043 A1* | 4/2020 | Ljung ............... B64U 50/11 |
| 2021/0053675 A1 | 2/2021 | Agronov |
| 2021/0147076 A1 | 5/2021 | Stearns et al. |
| 2021/0323691 A1* | 10/2021 | Foster ............... B64D 27/04 |
| 2023/0249817 A1* | 8/2023 | Groninga ........... B64D 31/14 |
| 2024/0055168 A1 | 2/2024 | Valero et al. |

FOREIGN PATENT DOCUMENTS

| | | |
|---|---|---|
| CN | 206900666 | 1/2018 |
| CN | 112937861 | 6/2021 |
| WO | 2020109100 | 6/2020 |

* cited by examiner

Primary Examiner — Tye William Abell
(74) Attorney, Agent, or Firm — Trojan Law Offices

(57) ABSTRACT

The invention provides a fuel-based, single-engine multirotor drone, wherein the drone comprises a body, a turboshaft engine to generate rotational movement, a plurality of rotors, a plurality of pulleys, a plurality of transmission belts, and a gearbox assembly. The gearbox assembly comprises a pair of coaxial counter-rotating gears which are coupled to a pair of coaxial counter-rotating shafts, wherein the rotational movement of the engine is transferred synchronously from the counter-rotating shafts of the gearbox to the plurality of the rotors through the plurality of pulleys and transmission belts.

15 Claims, 8 Drawing Sheets

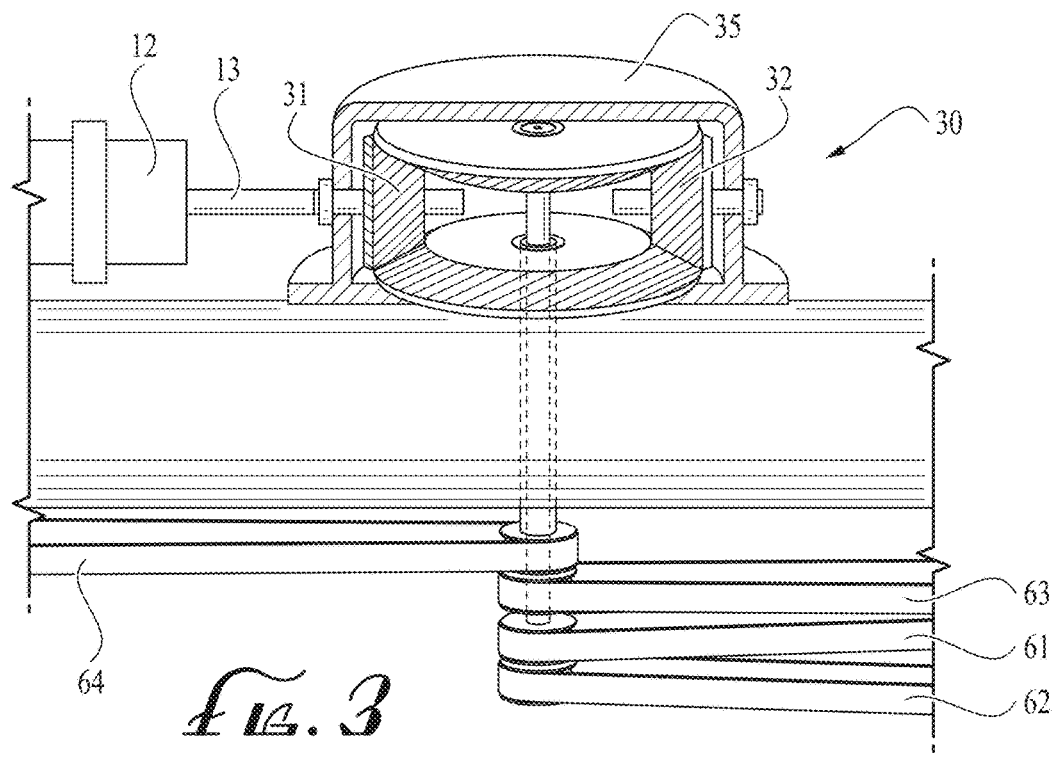
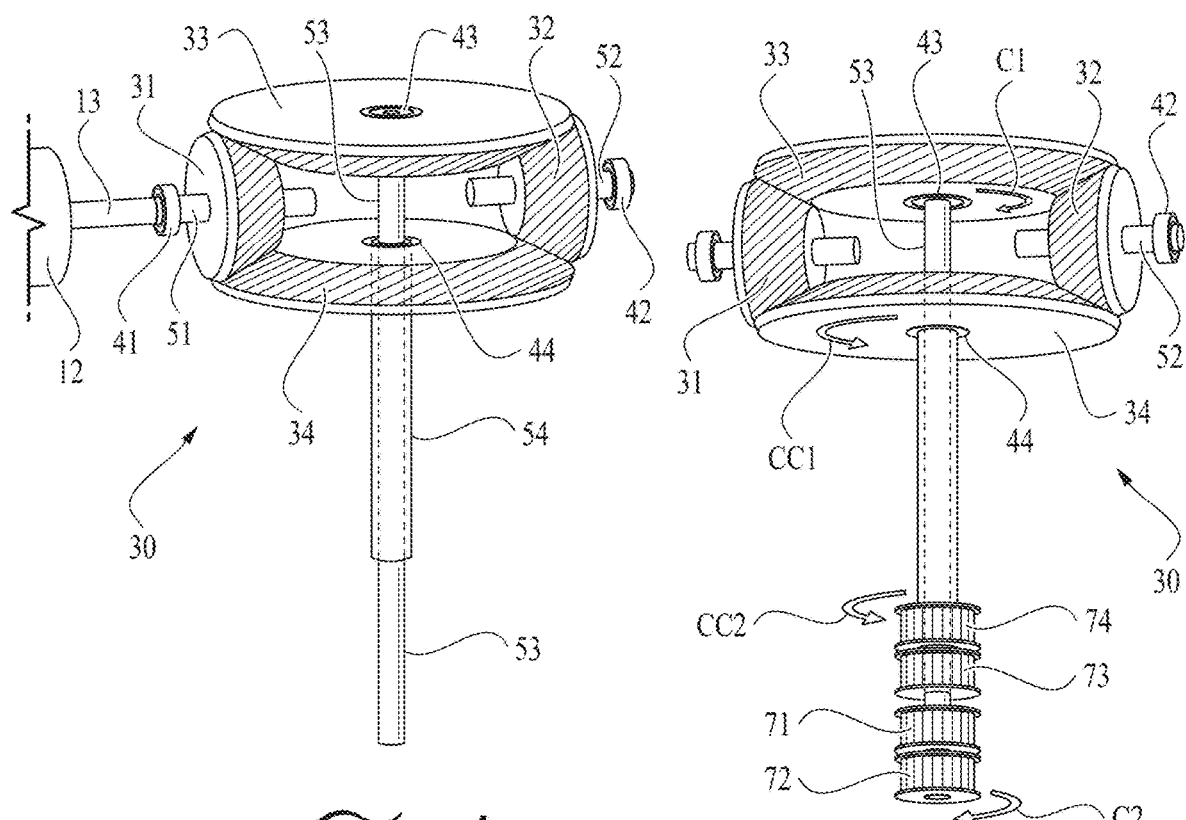

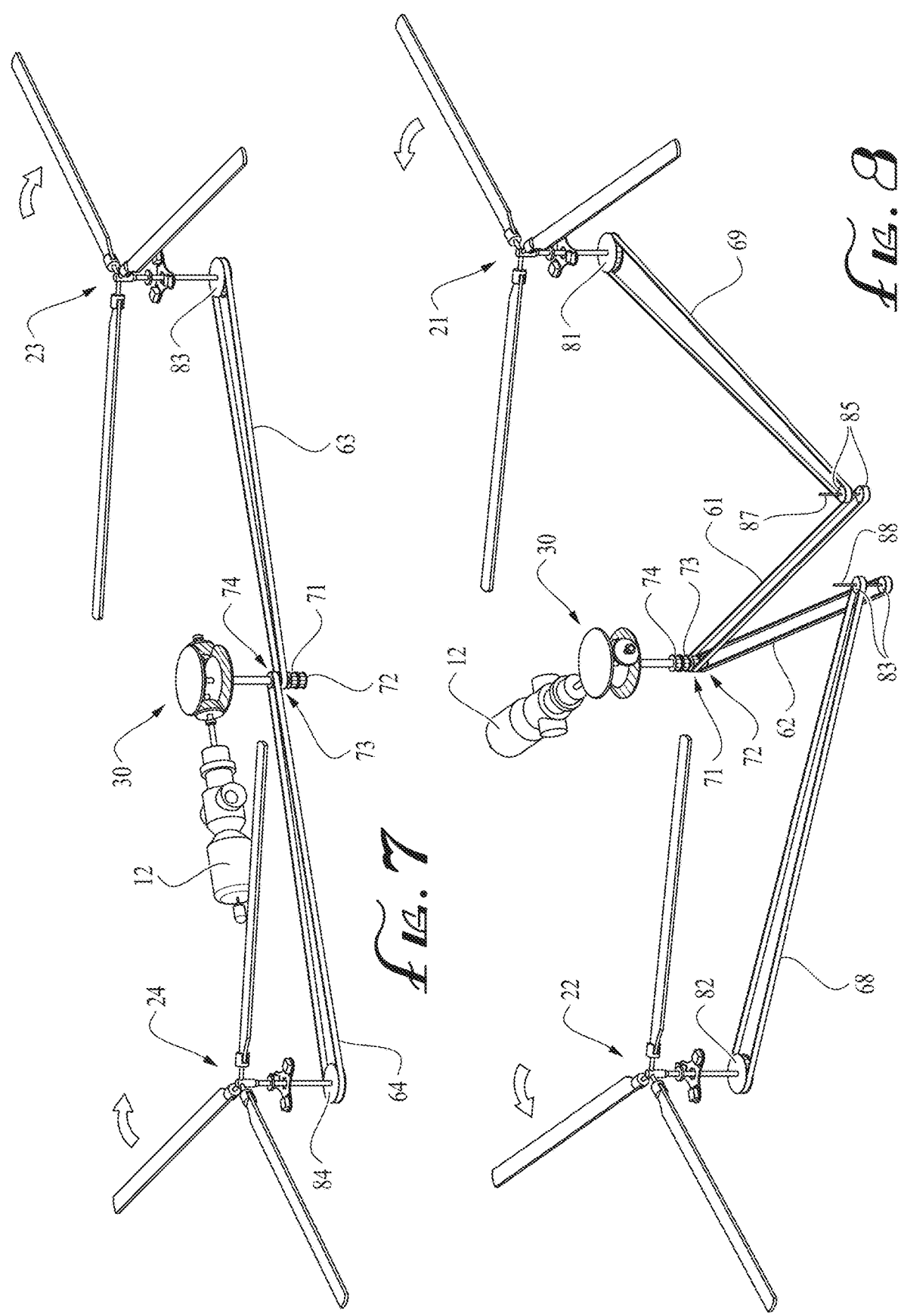

TURBOSHAFT ENGINE POWERED QUADROTOR DRONE

FIELD OF THE INVENTION

The present invention relates to drones or unmanned aerial vehicle (UAV), and in particular, to a new type of drone that uses standard fuel to power a plurality of rotors through a unique power transmission system that transfers the rotational movement from a turboshaft engine to the plurality of rotors.

BACKGROUND

Rotor flight vehicles, such as unmanned drones have been known in the art. There have been several attempts in the past by individuals and groups to build a small fuel-powered or electric-powered drone/UAV, capable of vertical take-off and landing (VTOL). However, such systems suffer from reliability issues, and most of them are too expensive to design, test, manufacture, and deploy. Additionally, the development of these systems is significantly lengthy and costly.

Different systems of propulsions of the rotors have been suggested. In more recent years unmanned drones have applied a system of using one motor per rotor. Usually, this motor is electric which provides for control of the rotational speed of the rotor. (See US 2020/015043 A1). The major problem with electric powered drones (that use lithium-ion or lithium polymer batteries) is that they cannot fly for long distances, making them impractical for most applications. The batteries are bulky and expensive. The batteries have a charge/discharge cycle limit. Even with the recent advancement in battery technology, drones still suffer from the range problem.

Most electric powered multirotor drones cannot fly for over 45 minutes, and they suffer from poor range which makes them impractical for most applications. For example, small electric drones struggle to survey hectares of land in one battery charge. Such drones mostly use lithium ion (cylindrical cells) or lithium polymer (pouch type cells) as a power source, which is cumbersome to order and expensive to replace, and also time consuming to charge up to full capacity. They cannot lift payloads that are heavy enough to classify these drones as practical vehicles for transport, logistics, emergency, or military related applications.

Lithium batteries have nowhere close to the energy density that an equivalent sized tank of diesel fuel or kerosene has. It also takes hours of time to charge large batteries. But it's relatively quicker to refuel a tank in a minute. Accordingly, it is an object of the present invention to provide a novel, low cost, fuel-based, single-engine multirotor unmanned drone with a unique transmission system that transfers the power synchronously from a fuel based engine, such as a turboshaft engine, to the rotors. This system utilizes a full swashplate control system per rotor head. This drone has a plethora of applications in fields like the aerospace industry, last mile logistics, emergency medical deliveries, and more. It can fly and cover much greater distances than any electric drone or helicopter, making it more practical and cost effective to use in the long run. Additionally, the cost of fuel, such as Kerosene, is much less than the cost of buying and maintaining batteries. According to various implementations of the present invention, the drone has an incredibly high thrust to weight ratio, making it an outstanding choice for military purposes. It can lift heavy guns and artillery. It can also lift a servo motor controlled turret/gimbal that can be used to control and aim any small weapon. Apart from offensive purposes, it can also be used for reconnaissance/surveillance by carrying a powerful telephoto camera and a larger fuel tank to cover greater distances. Applications for military and law enforcement involve carrying guns or turrets, small warheads or even important packages for delivery during emergencies, packages that electric drones are too small to lift and that current military helicopters are not agile enough to deliver quickly. More examples: rapid ammunition restocking on field, food delivery, first aid delivery, etc. Niche non-military applications involve heart-transplant organ delivery, search and rescue operations, emergency package delivery, and more. Advanced strategies can also be programmed, it can loiter at high altitudes and remain hidden (from sight and sound) in case the mission requires such tactics.

SUMMARY

The present invention provides a multirotor drone that comprises a body, an engine to generate rotational movement, a plurality of rotors coupled to the body, a plurality of pulleys, a plurality of transmission belts, a gearbox assembly comprising, a first gear and a second gear, the first gear and the second gear are configured to be counter-rotating, a first shaft and a second shaft, the first shaft and the second shaft are configured to be counter-rotating, wherein the first shaft is connected to a first center of the first gear, and the second shaft is connected to a second center of the second gear. The engine is coupled to the gearbox assembly such that the rotational movement of the engine is transferred from the engine to the first shaft and the second shaft through the first gear and the second gear respectively, and from the first shaft and the second shaft to the plurality of the rotors through the plurality of pulleys and the plurality of transmission belts.

The gearbox assembly further comprises a first drive gear, wherein the first drive gear is connected to a drive shaft of the engine, and the first drive gear is further engaged with the first gear and the second gear of the gearbox assembly, such that the rotational movement of the engine is transferred to the first gear and the second gear through the drive gear. The gearbox assembly can further comprise a second drive gear, wherein the second drive gear is connected to a drive shaft of a second engine, and the second drive gear is further engaged with the first gear and the second gear of the gearbox assembly, such that a rotational movement of the second engine is transferred to the first gear and the second gear through the second drive gear. The first drive gear, the first gear, and the second gear can be bevel gears.

The plurality of rotors may comprise a first set of rotors and a second set of rotors, and the plurality of pulleys may comprise a first set of shaft pulleys and a second set of shaft pulleys, wherein the first set of shaft pulleys are attached to the first shaft, and the second set of shaft pulleys are attached to the second shaft, and wherein the rotational movement is transferred from the first shaft through the first set of shaft pulleys and the plurality of transmission belts to the first set of rotors, and wherein the rotational movement is transferred from the second shaft through the second set of shaft pulleys and the plurality of transmission belts to the second set of rotors, thereby rotating the plurality of the rotors of the multirotor drone.

The first set of rotors may comprise a left rotor and a right rotor, and the second set of rotors may comprise a front rotor and a rear rotor, wherein the rotational movement is transferred from the first shaft of the gearbox assembly through the first set of shaft pulleys and the plurality of transmission belts to the left rotor and the right rotor, and wherein the rotational movement is transferred from the second shaft of the gearbox assembly to the front rotor and the rear rotor through the second set of shaft pulleys and the plurality of transmission belts, thereby rotating the plurality of the rotors of the multirotor drone. The plurality of transmission belts may comprise a front-rotor belt, a rear-rotor belt, a primary left-rotor belt, a secondary left-rotor belt, a primary right-rotor belt, a secondary right-rotor belt, wherein the front-rotor belt and the rear-rotor belt transfer the rotational movement from the second set of shaft pulleys to the front rotor and the rear rotor, the primary left-rotor belt transfers the rotational movement to a set of left-rotor idlers, and the secondary left-rotor belt transfers the rotational movement from the set of left-rotor idlers to the left rotor, and the primary right-rotor belt transfers the rotational movement to a set of right-rotor idlers, and the secondary right-rotor belt transfers the rotational movement from the set of right-rotor idlers to the right rotor. The set of left-rotor idlers and the set of right-rotor idlers can be positioned in proximity of a shaft of the front rotor, in order to, as a non-limiting example, avoid adding additional parts to the body of the drone to cover the connecting parts between the gearbox assembly and the left and right rotors. The engine can be a fuel-based turboshaft engine.

In another implementation of the invention, a multirotor drone is disclosed, wherein the drone comprises a body, an engine to generate rotational movement, a plurality of rotors that are coupled to the body, a plurality of pulleys, a plurality of transmission belts, and a gearbox assembly. The gearbox assembly comprises two counter-rotating gears, wherein the two counter-rotating gears are coaxial, and two counter-rotating shafts that are connected to the two counter-rotating gears, wherein the two counter-rotating shafts are coaxial. The engine is coupled to the gearbox assembly.

The plurality of rotors comprises a first set of rotors and a second set of rotors, the plurality of pulleys comprises a first set of shaft pulleys and a second set of shaft pulleys, wherein the first set of shaft pulleys are mounted onto a first shaft of the two counter-rotating shafts, and the second set of shaft pulleys are mounted onto a second shaft of the two counter-rotating shafts. The rotational movement of the engine is transferred from the engine to the two counter-rotating shafts through the two counter-rotating gears, the rotational movement is transferred from the first shaft of the two counter-rotating shafts through the first set of shaft pulleys and transmission belts, and the rotational movement is transferred from the second shaft of the two counter-rotating shafts to the second set of rotors through the second set of shaft pulleys and transmission belts, thereby rotating the plurality of the rotors of the multirotor drone. The first set of rotors may comprise a left rotor and a right rotor, and the second set of rotors may comprise a front rotor and a rear rotor, wherein the rotational movement is transferred from the first shaft of the two counter-rotating shafts through the first set of shaft pulleys to the left rotor and the right rotor, and wherein the rotational movement is transferred from the second shaft of the two counter-rotating shafts through the second set of shaft pulleys to the front rotor and the rear rotor, thereby rotating the plurality of the rotors of the multirotor drone.

The transmission belts may comprise a front-rotor belt, a rear-rotor belt, a primary left-rotor belt, a secondary left-rotor belt, a primary right-rotor belt, a secondary right-rotor belt, wherein the front-rotor belt and the rear-rotor belt transfer the rotational movement from the second set of shaft pulleys to the front rotor and the rear rotor, the primary left-rotor belt transfers the rotational movement to a set of left-rotor idlers, and the secondary left-rotor belt transfers the rotational movement from the set of left-rotor idlers to the left rotor, and the primary right-rotor belt transfers the rotational movement to a set of right-rotor idlers, and the secondary right-rotor belt transfers the rotational movement from the set of right-rotor idlers to the right rotor. The set of left-rotor idlers and the set of right-rotor idlers can be positioned in proximity to the shaft of the front rotor. The engine can be a fuel based turboshaft engine.

According to another implementation of the invention, the invention provides a quadrotor drone that comprises a body, a fuel tank, a turboshaft engine to generate rotational movement, a gearbox assembly, a plurality of pulleys, a plurality of transmission belts, and a plurality of rotors including a front rotor, a rear rotor, a left rotor, and a right rotor. The gearbox assembly comprises a drive gear that is connected to a shaft of the turboshaft engine, a pair of synchronized gears, wherein the pair of synchronized gears are configured to counter-rotate relative to each other by a drive gear, and a pair of synchronized shafts that are connected to the pair of synchronized gears, wherein when the pair of synchronized gears counter-rotate, the pair of synchronized shafts counter-rotate. The rotational movement is transferred from a first shaft of the pair of synchronized shafts through the plurality of pulleys and the plurality of transmission belts to the left rotor and the right rotor, and the rotational movement is transferred from a second shaft of the pair of synchronized shafts through the plurality of pulleys and the plurality of transmission belts to the front rotor and the rear rotor, thereby rotating the plurality of rotors of the quadrotor drone.

The plurality of pulleys may comprise a first set of shaft pulleys and a second set of shaft pulleys, wherein the first set of shaft pulleys are affixed to the first shaft of the pair of synchronized shafts, and the second set of shaft pulleys are affixed to a second shaft of the pair of synchronized shafts. The rotational movement is transferred from the first shaft of the pair of synchronized shafts through the first set of shaft pulleys and the plurality of transmission belts to the left rotor and the right rotor, and the rotational movement is transferred from the second shaft of the pair of synchronized shafts through the second set of shaft pulleys and the plurality of transmission belts to the front rotor and the rear rotor, thereby rotating the plurality of the rotors of the multirotor drone.

The plurality of transmission belts may comprise a front-rotor belt, a rear-rotor belt, a primary left-rotor belt, a secondary left-rotor belt, a primary right-rotor belt, a secondary right-rotor belt, wherein the front-rotor belt and the rear-rotor belt transfer the rotational movement from the second set of shaft pulleys to the front rotor and the rear rotor, the primary left-rotor belt transfers the rotational movement to a set of left-rotor idlers, and the secondary left-rotor belt transfers the rotational movement from the set of left-rotor idlers to the left rotor, the primary right-rotor belt transfers the rotational movement to a set of right-rotor idlers, and the secondary right-rotor belt transfers the rotational movement from the set of right-rotor idlers to the right rotor. The set of left-rotor idlers and the set of right-rotor idlers can be positioned in proximity to the shaft of the front rotor. The pair of synchronized gears can be configured to be coaxial, and the pair of synchronized shafts can be configured to be coaxial.

BRIEF DESCRIPTION OF THE FIGURES

FIG. 3 illustrates a perspective view of a gearbox assembly of the quadrotor drone, wherein the gearbox assembly is further connected to shaft pulleys.

FIG. 4 illustrates a perspective view of the gearbox assembly.

FIG. 5 illustrates a perspective view of the gearbox assembly, wherein the shafts of the gearbox assembly are connected to shaft pulleys.

FIG. 7 illustrates a perspective view of the connections between the gearbox assembly, on one hand, and a front and rear rotors, on the other hand, through a plurality of pulleys and belts.

FIG. 8 illustrates a perspective view of the connections between the gearbox assembly, on one hand, and a left and right rotors, on the other hand, through a plurality of pulleys and belts.

DESCRIPTION

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

Figure 9:
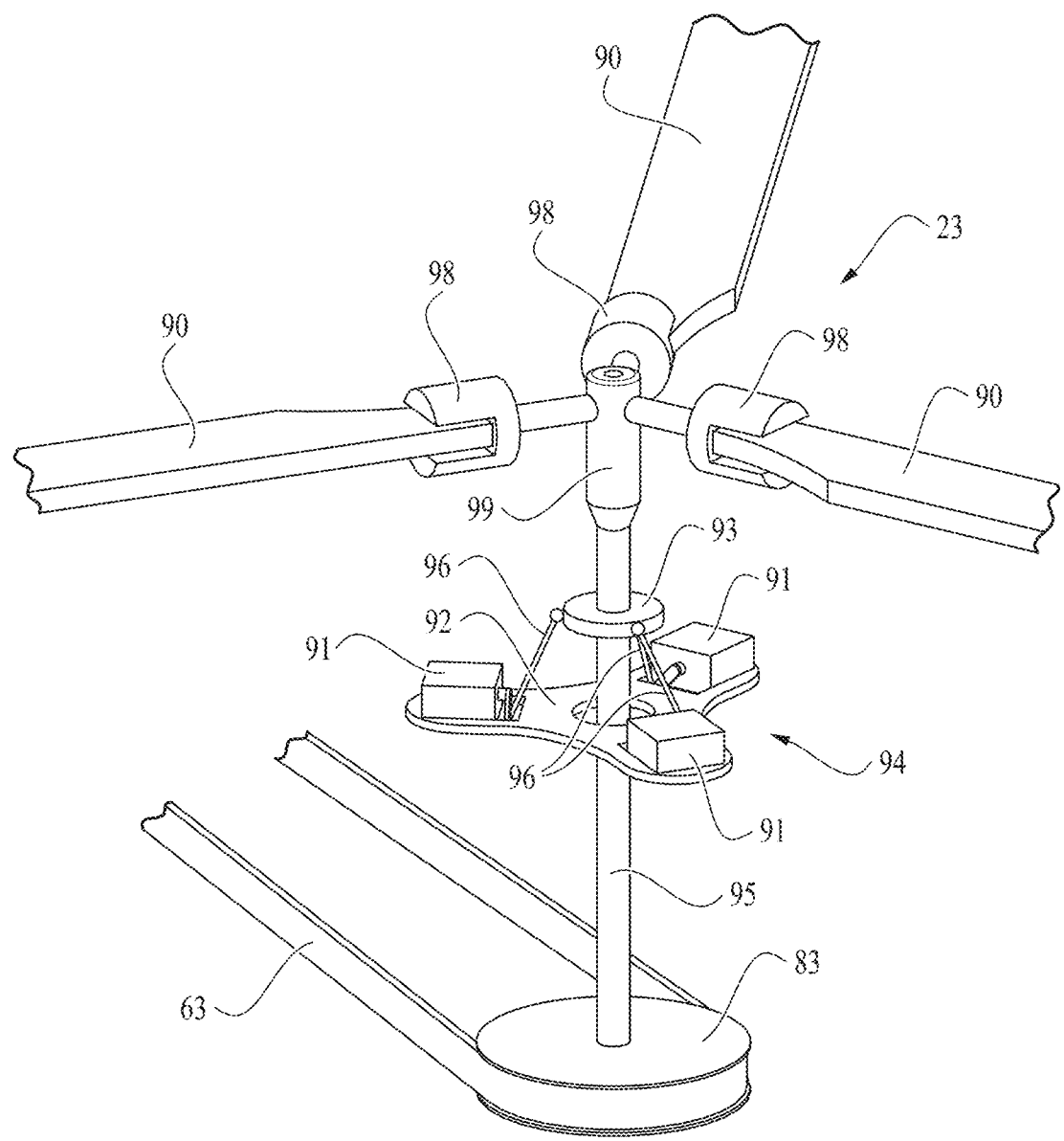
FIG. 9 illustrates a perspective view of one of the rotors of the quadrotor drone.
Figure 10:
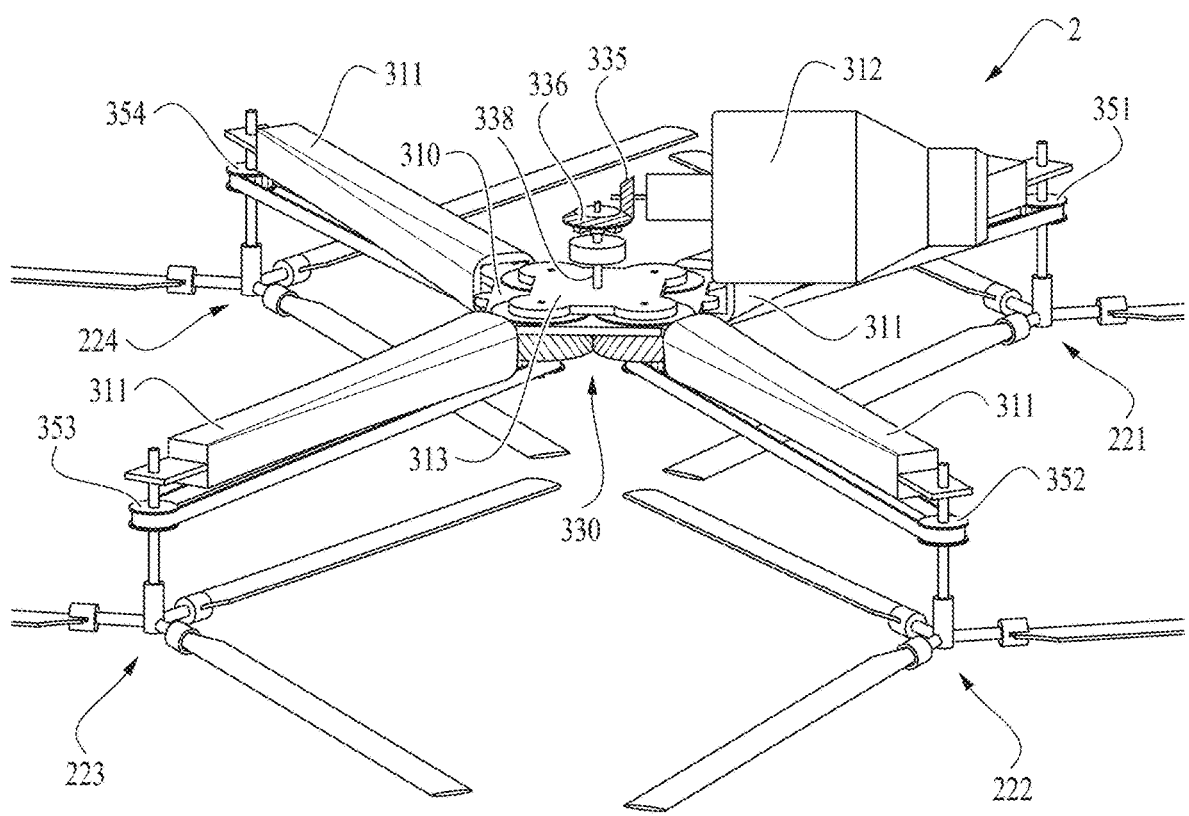
FIG. 10 illustrates a bottom perspective view of the second embodiment of the quadrotor drone.
Figure 11:
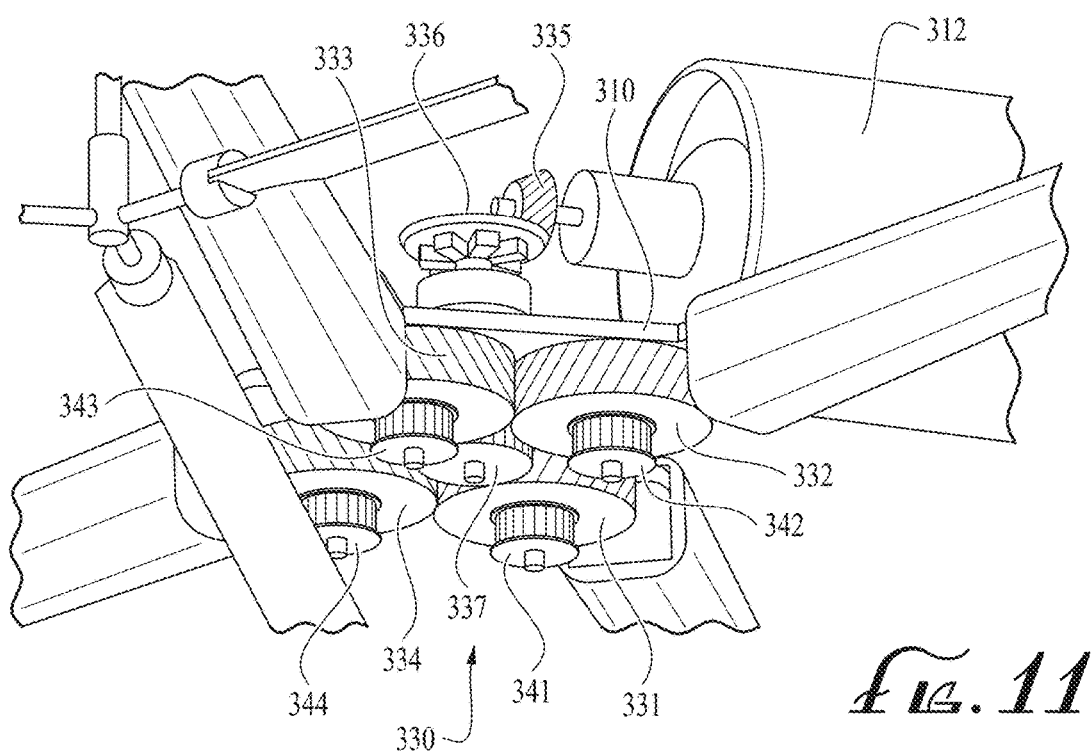
FIG. 11 illustrates a bottom perspective view of the gearbox assembly of the second embodiment of the quadrotor drone.
Figure 12:
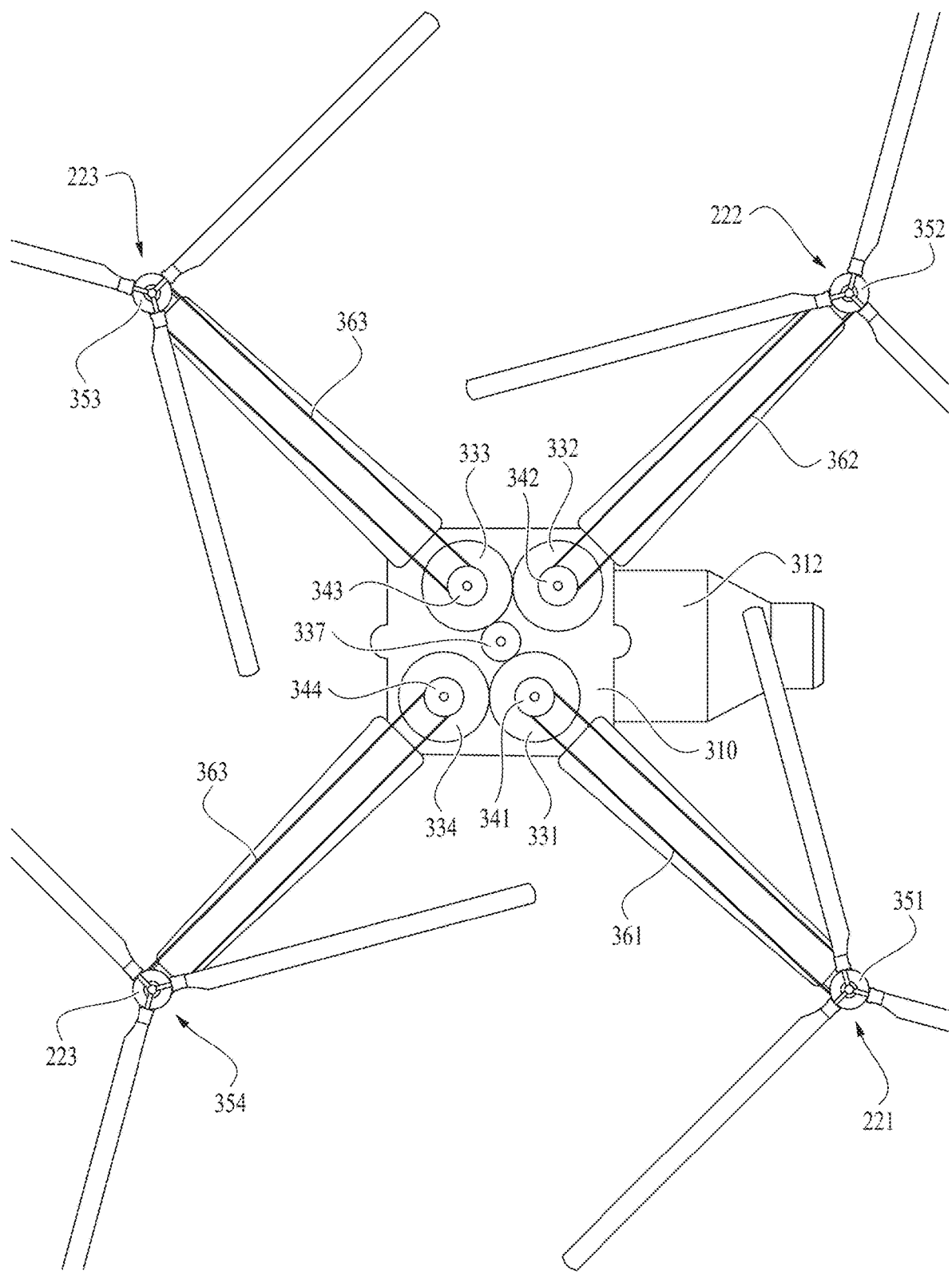
FIG. 12 illustrates a bottom view of the second embodiment of the quadrotor drone.

FIGS. 1-9 show to the first embodiment of the invention, and FIGS. 10-12 show the second embodiment of the invention.

Figure 1:
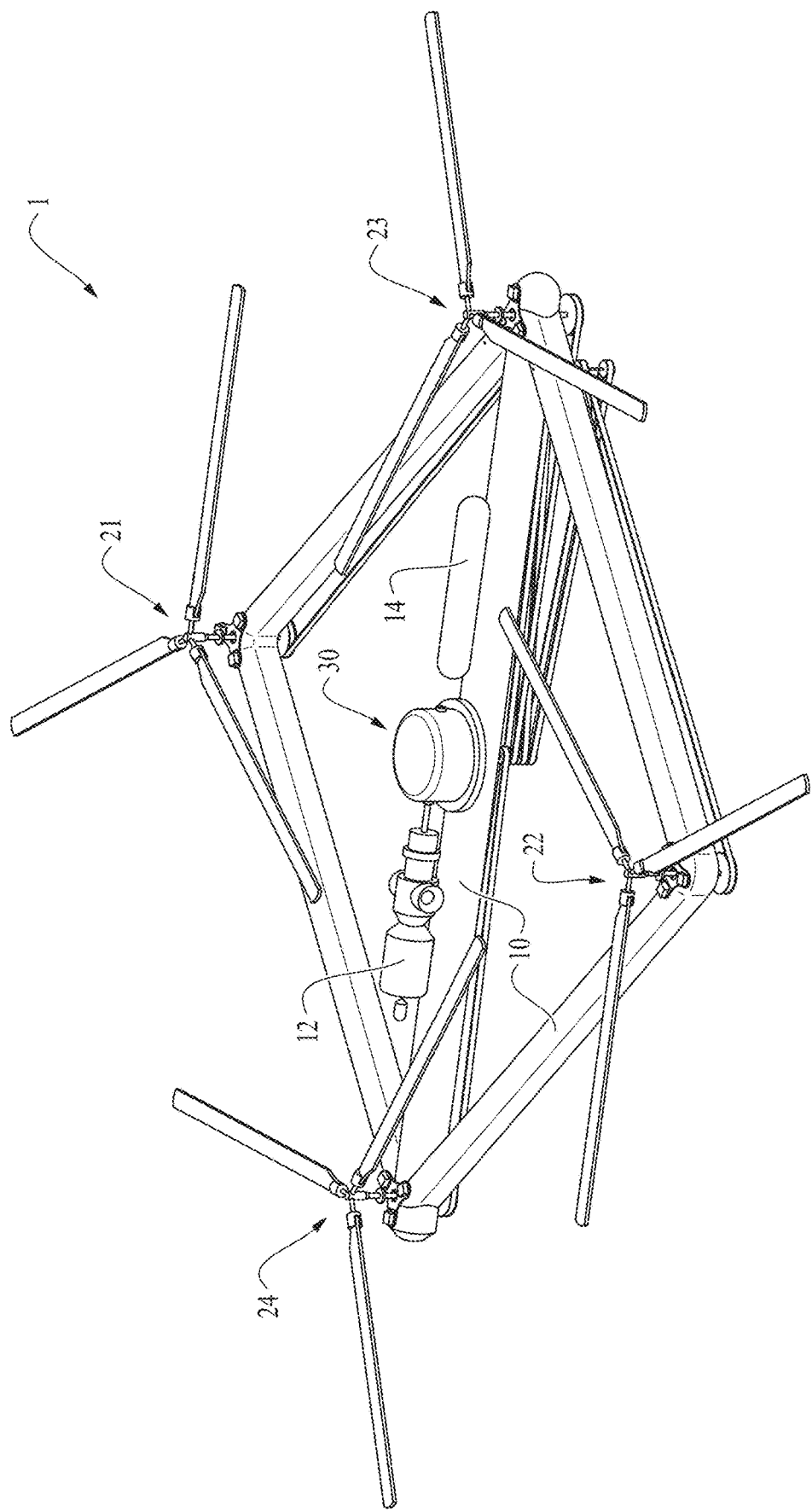
FIG. 1 illustrates a top perspective view of a first embodiment of a quadrotor drone.
Figure 2:
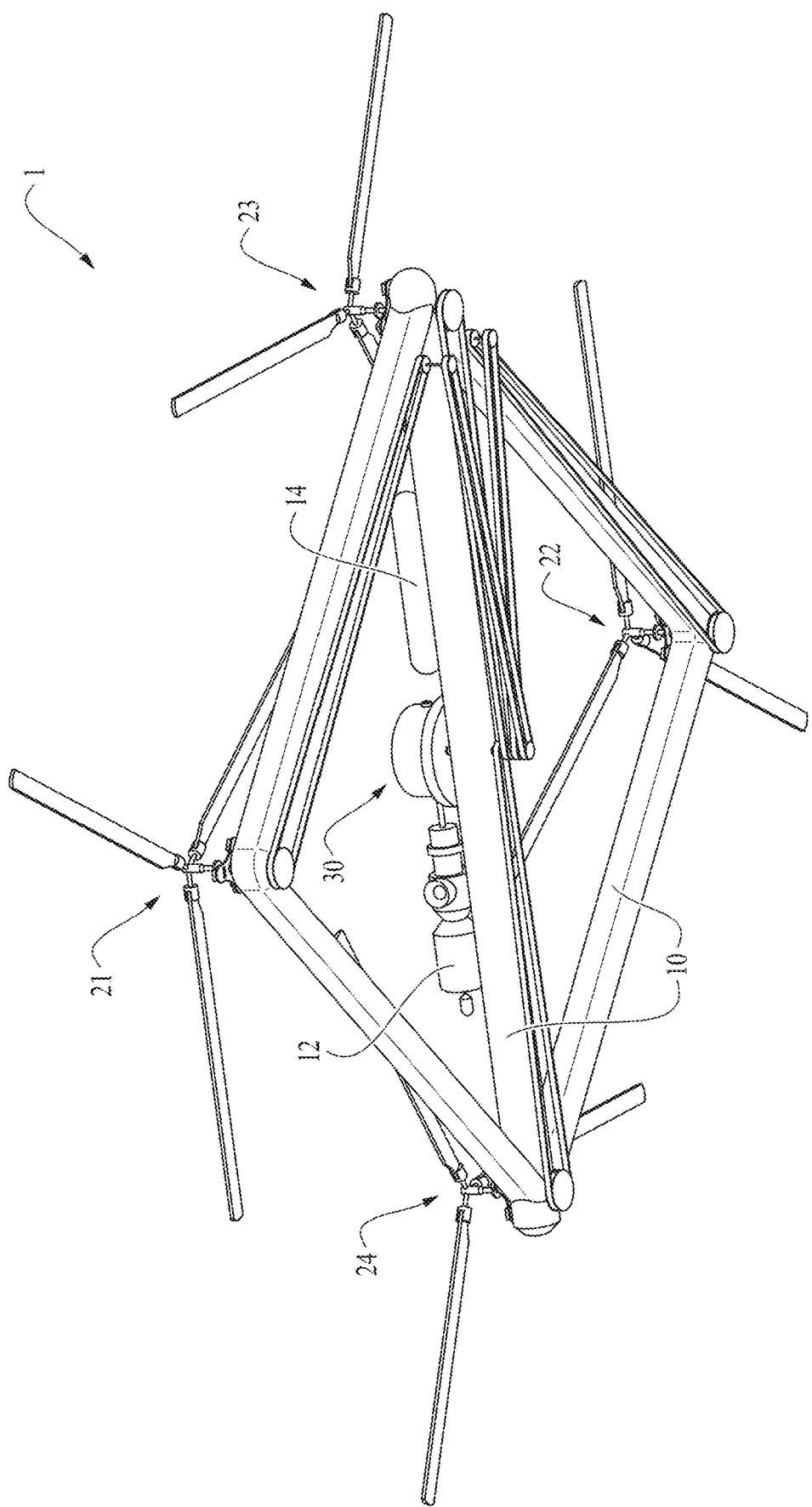
FIG. 2 illustrates a bottom perspective view of the first embodiment of the quadrotor drone.

Referring to FIGS. 1-2, the figures illustrate illustrates a top and a bottom perspective view of the first embodiment of a quadrotor drone 1. The drone 1 comprises a body 10, an engine 12, a fuel tank 14, a gearbox assembly 30, a plurality of rotors (21-24), a plurality of pulleys (pulleys 71-74 in FIG. 5 and pulleys 81-86 in FIGS. 7-8), and a plurality of transmission belts (belts 61-64, 68, and 69 in FIGS. 7-8). The engine 12 uses fuel from the fuel tank 14 to generate rotation movement, the rotational movement is transferred to the gearbox assembly 30, and from the gearbox assembly 30 to the rotors (21-24) through the plurality of pulleys and the plurality of transmission belts as will be further discussed below. The plurality of rotors (21-24) comprises the left rotor 21, the right rotor 22, the front rotor 23, and the rear rotor 24. The fuel tank 14 is very customizable and can be placed in a variety of locations, but it is optimal to place the fuel tank as close to the center of gravity of the drone 1 as possible. In this case, we use the fuel tank to balance the weight of the engine 12 and gearbox assembly 30 on the body 10. In an exemplary embodiment of the invention, the fuel tank can have an approximate volume of 3.1 liters or close to a gallon. Since the drone can lift heavier payloads, it can also lift a modified 3 gallon fuel tank to extend its range significantly.

Referring to FIGS. 3-5, the figures illustrate a perspective view of the gearbox assembly 30 of the quadrotor drone 1. FIG. 3 illustrates a perspective view of the gearbox assembly 30 of the quadrotor drone 1, wherein the gearbox assembly 30 is partially enclosed within a housing 35. As will be further explained in detail in the next paragraphs, the engine's output is coupled to a drive gear 31 of the gearbox assembly 30, wherein the drive gear 31 engages two large, counter-rotating bevel gears (33, 34) with counter-rotating shafts (53, 54), wherein the smaller shaft (the first shaft 53 with the smaller cross-sectional diameter) spins inside the larger hollow shaft (the second shaft 54 with the larger cross-sectional diameter) in the opposite direction. With this configuration, continuous lubrication is not needed and molybdenum disulfide grease can be used. Each of the two shafts (the first shaft 53 or the second shaft 54) is connected to two shaft pulleys (the shaft pulleys 71-72 or 73-74 respectively). So, as the shafts are counter-rotating, the two shaft pulleys (71-72) rotate in one direction (see arrows C1 and C2) and the other two shaft pulleys (73-74) rotate in an opposite direction (see arrows CC1 and CC2).

Referring to FIGS. 4-5s, the gearbox assembly comprises a first drive gear 31 that is coupled to the drive shaft 51, a first gear 33, a second gear 34, a first shaft 53, and a second shaft 54. The first drive shaft 51 is coupled to the engine shaft 13 through a coupling 41 to transfer the rotational movement to the drive gear 31. The drive gear 31 engages both the first gear 33 and the second gear 34, such that the drive gear 31 simultaneously turns the first gear 33 in one direction (as shown by arrow C1) and turns the second gear 34 in an opposite direction (as shown by arrow CC1). In other words, the first gear 33 and the second gear 34 are configured to be counter-rotating. The first gear 33 is connected to a first shaft 53 through a coupling 43 so the rotational movement of the first gear 33 is transferred to the first shaft 53. The second gear 34 is connected to a second shaft 54 through a coupling 44 so the rotational movement of the second gear 34 is transferred to the second shaft 54. As the first gear 33 and the second gear 34 are counter-rotating, the first shaft 53 and the second shaft 54 are also counter-rotating.

At the opposite end of the first drive gear 31 is a second drive gear 32 that can function as an idler bevel gear, wherein such an idler bevel gear can be made out of a high-strength, low-friction material such as Delrin. This helps reduce noise and dampen radial vibrations generated by the other gears in the gearbox assembly at high speed. In an implementation of the invention, to increase the drone's ability to lift even greater loads, a second engine (e.g. a second turboshaft engine) can be added. This will have reduced flight time (because of greater fuel consumption) at the expense of greater payload lifting capacity. A larger fuel tank can be provided to compensate for the loss in range. In this configuration, the second drive gear 32 is connected to a second engine (not shown) through the second drive shaft 52 and a coupling 42 to provide rotational movement. This twin-turboshaft ramification of the drone offers a high thrust to weight ratio.

Referring to FIG. 5, the figure illustrates another perspective view of the gearbox assembly, wherein the first shaft 53 is coupled to the shaft pulley 71 and the shaft pulley 72, and the second shaft 54 is coupled to the shaft pully 73 and the shaft pulley 74. Therefore, as the first shaft 53 and the second shaft 54 are counter-rotating, the shaft pully 71 and the shaft pully 72, on one hand, and the shaft pully 73 and the shaft pully 74, on the other hand, are also configured to be counter-rotating. Therefore, the shaft pulleys 71-72 turn in the same direction (as shown by arrow C2) with the first gear 33 and the first shaft 53 (see the arrow C1), and the shaft pulleys 73-74 turn in the same direction (as shown by arrow CC2) with the second gear 34 and the second shaft 54 (see the arrow C2). The rotational movement of the first shaft 53 is transferred to the left rotor 21 (left rotor 21 is shown in FIGS. 1-2) through the shaft pully 73, and the rotational movement of the first shaft 53 is transferred to the right rotor 22 (right rotor 22 is shown in FIGS. 1-2) through the shaft pully 72. The rotational movement of the second shaft 54 is transferred to the front rotor 23 (front rotor 23 is shown in FIGS. 1-2) through the shaft pully 73, and the rotation movement of the second shaft 54 is transferred to the rear rotor 24 (rear rotor 24 is shown in FIGS. 1-2) through the shaft pully 74.

Figure 6:
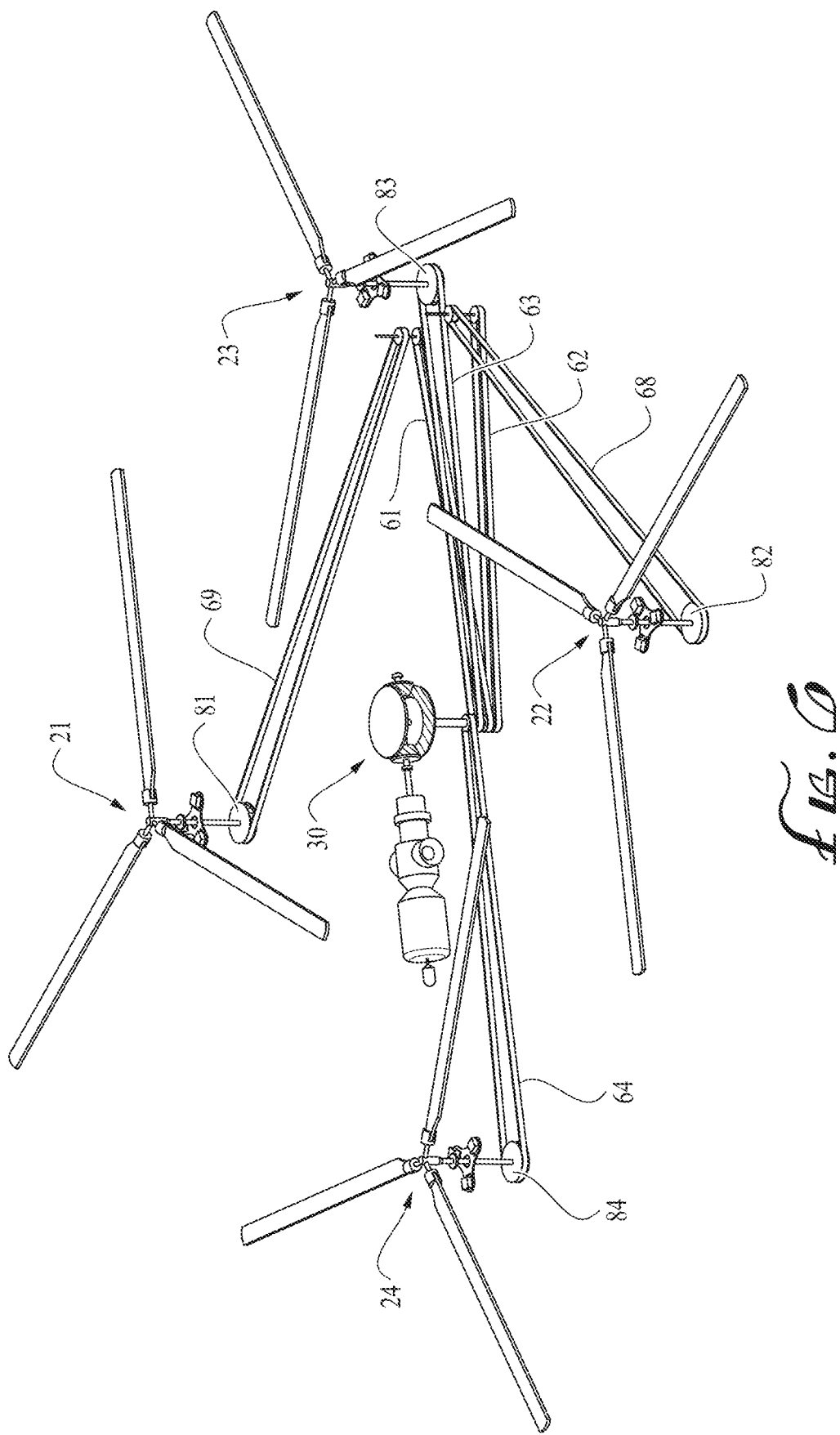
FIG. 6 illustrates a perspective view of the quadrotor drone with its body removed to show the transmission of power from the gearbox assembly to the rotors through a plurality of pulleys and belts.

Referring to FIGS. 6-8, the figures show how the rotational power is transferred from the gearbox assembly 30 to the plurality of rotors (21-24). As will be further explained in detail in the next paragraphs, the shaft pulleys (71-74) are connected to the rotor pulleys (81-84) through a plurality of idler pulleys and a plurality of transmission/timing belts. The rotor pulley of each of the rotors can be connected to the shaft of the rotor by a one-way bearing attached between the rotor pulley and the rotor shaft. This special bearing is very important and makes sure that the drone can save itself from a crash by performing an autorotation maneuver during an emergency like an engine failure. The shafts of the left and right rotors are connected to idler pulleys (85-86) near the shaft of the front rotor of the drone. These idler pulleys (85-86) are two pairs of coaxial pulleys connected to a pair of idler shafts (87-88) that can freely spin. Each pair of coaxial idler pulleys (85-86) are in 1:1 ratio and do not affect speed or synchrony of the four rotors of the drone. In an implementation of the invention, belt tensioners are used for every single transmission/timing belt to keep it under tension, and pulleys are aligned to be on the same plane without any offset to the extent that no belt intersects or meshes with any other belt.

FIG. 7 shows the details of the transmission mechanism between the gearbox assembly 30, on one hand, and the front rotor 23 and the rear rotor 24, on the other hand, through shaft pulleys 73-74, transmission belts 63-64, and the rotor pulleys 83-84. The shaft pulleys 73-74 are further shown in FIGS. 5 and 8. As shown in FIG. 7, the rotational movement of the gearbox 30 is transferred to the front rotor 23 through the shaft pulley 73, transmission belt 63, and the rotor pulley 83. The rotational movement of the gearbox 30 is transferred to the rear rotor 24 through the shaft pully 74, transmission belt 64, and the rotor pulley 84.

FIG. 8 shows the details of the transmission mechanism between the gearbox assembly 30, on one hand, and the left rotor 21 and the right rotor 22, on the other hand, through shaft pulleys 71-72, transmission belts 61-62, to pairs of idler pulleys 85-86, transmission belts 68-69, and the rotor pulleys 81-82. The shaft pulleys 71-72 are further shown in FIGS. 5 and 7. As shown in FIG. 8, the rotational movement of the gearbox 30 is transferred from the shaft pulley 71 to the pair of coaxial idler pulleys 85 through the transmission belt 61, and then transferred from the pair of coaxial idler pulleys 85 to the rotor pulley 81 through the transmission belt 69, wherein the rotor pulley 81 transfers the rotational movement to the left rotor 21. With a similar mechanism, the rotational movement of the gearbox 30 is transferred from the shaft pulley 72 to the pair of coaxial idler pulleys 86 through the transmission belt 62, and then transferred from the pair of coaxial idler pulleys 86 to the rotor pulley 82 through the transmission belt 68, wherein the rotor pulley 82 transfers the rotational movement to the right rotor 22.

The gearbox assembly 30, the pulleys, and the transmission belts as described above work together to synchronously distribute rotational movement of the engine to the four rotors of the drone. All of the four rotors are synchronized (in terms of rotational speed) and will always maintain the same speed relative to each other. This is done to prevent the rotor blades from colliding with each other.

Referring to FIG. 9, as a non-limiting example, the figure illustrates a perspective view of one of the rotors (the front rotor 23) of the quadrotor drone. The other rotors comprise similar parts. The rotor 23 comprises a rotor head 99, rotor blades 90, rotor blade grips 98, and a rotor shaft 95. The rotor is further equipped with a swashplate mechanism 94, comprising a spinning rotor disk 93, a bottom swashplate 92, and three servo motors 91. The three servo motors 91 are positioned on the bottom swashplate 92, and are arranged 120 degrees apart. The three servo motors 91 are configured to tilt the spinning rotor disc through the arms 96. The servo motors establish cyclic control over the swashplate mechanism. This allows the drone to 'Yaw', 'Pitch', and 'Roll', to control the height and direction of the drone. Increasing the rotor speed will increase the agility and responsiveness of the drone. The rate of Yaw, rate of pitch or rate of Roll is affected proportionally. As a non-limiting example, the speed of 2000 revolutions per minute (RPM) is the max rating for a rotor that utilizes carbon fiber rotor blades. When the rotor runs at a low RPM (e.g., 1200 RPM), then its fuel consumption is a lot lesser and is great for long range missions. This is at the expense of reduced agility of the drone.

Referring to FIGS. 10-12, the FIGS. 10-11 illustrate a bottom perspective view of the second embodiment of a quadrotor drone 2, and the FIG. 12 illustrate a bottom view of the second embodiment of a quadrotor drone 2. As shown in FIG. 10-12, the drone 2 comprises a body 310, a set of body frames 311, a plurality of rotors 221-224, an engine 312, and a gearbox assembly 330. The gearbox assembly 330 comprises a gearbox plate 313, a drive gear 337, a first gear 331, a second gear 332, a third gear 333, a fourth gear 334, and a set of four gearbox pulleys (341-344), wherein each pulley of the set of four gearbox pulleys (341-344) is connected to the corresponding gear (331-334), respectively. The gears 331-334 are coupled to the gearbox plate 313 and the body 310. The bevel gear 336 engages a bevel gear 335 to transfer the rotational movement of the engine 312 to the gearbox assembly 330 through the shaft 338. The shaft 338 transfers the rotational movement to the drive gear 337.

As shown in FIG. 12, the drive gear 337 engages both the first gear 331 and the third gear 333, wherein when the drive gear 337 turns, the first gear 331 and the third gear 333 are rotating counter-clockwise. The first gear 331 and the third gear 333 do not directly engage each other. The first gear 331 directly engages the fourth gear 334 but does not engage the second gear 332, and the third gear 333 further engages the second gear 332 but does not engage the fourth gear 334. With this configuration, when the first gear 331 and the third gear 333 are rotating counter-clockwise, the second gear 332 and the fourth gear 334 are rotating clockwise. This configuration provides a synchronized transfer of rotational movement from the drive gear 337 to the gearbox pulleys (341-344), in which, the rotational power of the four gears (331-334) of the gearbox assembly is synchronously transferred to the four gearbox pulleys (341-344), and the rotational movement is further transferred from the four gearbox pulleys (341-344) to the rotor pulleys (351-355) of the rotors (221-225) through the transmission belts (361-364), respectively.

According to various embodiments of the invention, the engine 12 as shown in the first embodiment (FIG. 1) or the engine 312 as shown in the second embodiment of the quadrotor drone (FIG. 10) can be a fuel-based turboshaft engine, capable of running on fuels like kerosene, a specially made mix of kerosene and other chemicals, diesel, propane, or hydrogen. In an implementation of the invention, the engine generates rotational power of around 15 kilowatts at 14,000 RPM. The engine has a fuel pump, whose speed can be controlled electronically. This essentially allows the drone to have variable speed of the rotors. The engine drive/output shaft speed is proportionally changed with the pump speed. The speed is reduced and finally distributed to the rotors through the gearbox assembly. This acts as the 'Throttle' control, a very important parameter in stable flight and automatic landing.

In an implementation of the invention, to start the engine of the drone, a processing unit of the drone, such as a central processing unit (CPU), sends a signal to an engine starter to spool up. The CPU then sends a signal to the fuel pump of the engine to slowly pump fuel into the combustion chamber and subsequently a spark plug ignites the fuel. The engine's speed and torque is indirectly controlled by the fuel pump's flow rate. The fuel pump is a small diaphragm pump driven by a variable speed brushless motor. Pulse Width Modulated (PWM) signals (sent from the CPU/flight controller) are used to electronically control the power output of the engine. It reaches thermal efficiency only when the combustion chamber and turbine blades are around 700 degrees Celsius. Once the shaft of the engine starts rotating, it engages a clutch once it crosses a certain RPM. At this point the engine is warm, and the drive/output shaft protruding out of the clutch assembly will rotate.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claim.

What is claimed is:

1. A multirotor drone, comprising:
   a body;
   an engine to generate rotational movement;
   a plurality of rotors coupled to the body, the plurality of rotors comprising a first set of rotors comprising a left rotor and a right rotor, and a second set of rotors comprising a front rotor and a rear rotor;
   a plurality of shaft pulleys comprising a first set of shaft pulleys and a second set of shaft pulleys;
   a plurality of transmission belts;
   a gearbox assembly comprising,
      a first gear and a second gear, the first gear and the second gear are configured to be counter-rotating;
      a first shaft and a second shaft, wherein the first shaft and the second shaft are configured to be counter-rotating;
      the first shaft connected to a first center of the first gear, and the second shaft connected to a second center of the second gear;
      the first set of shaft pulleys attached to the first shaft, and the second set of shaft pulleys attached to the second shaft;
      wherein the rotational movement is transferred from the first shaft through the first set of shaft pulleys and the plurality of transmission belts to the first set of rotors, and wherein the rotational movement is transferred from the second shaft through the second set of shaft pulleys and the plurality of transmission belts to the second set of rotors;
   wherein the plurality of transmission belts comprises a front-rotor belt, a rear-rotor belt, a primary left-rotor belt, a secondary left-rotor belt, a primary right-rotor belt, a secondary right-rotor belt;
   wherein the front-rotor belt and the rear-rotor belt transfer rotational movement from the second set of shaft pulleys to the front rotor and the rear rotor;
   wherein the primary left-rotor belt transfers rotational movement to a set of left-rotor idlers, and the secondary left-rotor belt transfers rotational movement from the set of left-rotor idlers to the left rotor;
   wherein the primary right-rotor belt transfers rotational movement to a set of right-rotor idlers, and the secondary right-rotor belt transfers rotational movement from the set of right-rotor idlers to the right rotor; and
   the engine is coupled to the gearbox assembly such that the rotational movement of the engine is transferred from the engine to the first shaft and the second shaft through the first gear and the second gear respectively, and from the first shaft and the second shaft to the plurality of the rotors through the plurality of pulleys and the plurality of transmission belts.

2. The multirotor of claim 1, wherein the set of left-rotor idlers and the set of right-rotor idlers are positioned in proximity of a shaft of the front rotor.

3. The multirotor of claim 1, wherein the engine is a fuel based turboshaft engine.

4. The multirotor drone of claim 1, wherein the gearbox assembly further comprises a first drive gear;
   the first drive gear is connected to a drive shaft of the engine;
   the first drive gear is further engaged with the first gear and the second gear;
   wherein the rotational movement of the engine is transferred to the first gear and the second gear through the drive gear.

5. The multirotor drone of claim 4, wherein the gearbox assembly further comprises a second drive gear;
   the second drive gear is connected to a drive shaft of a second engine;
   the second drive gear is further engaged with the first gear and the second gear;
   wherein a rotational movement of the second engine is transferred to the first gear and the second gear through the second drive gear.

6. The multirotor of claim 4, wherein the first drive gear, the first gear, and the second gear are bevel gears.

7. A multirotor drone, comprising:
   a body;
   an engine to generate rotational movement;
   a plurality of rotos coupled to the body;

a plurality of pulleys;
a plurality of transmission belts;
a gearbox assembly comprising,
- two counter-rotating gears, the two counter-rotating gears being coaxial;
- two counter-rotating shafts connected to the two counter-rotating gears, the two counter-rotating shafts being coaxial;

the engine is coupled to the gearbox assembly;
the plurality of rotors comprising a first set of rotors and a second set of rotors;
the plurality of pulleys comprising a first set of shaft pulleys and a second set of shaft pulleys, the first set of shaft pulleys being mounted onto a first shaft of the two counter-rotating shafts, and the second set of shaft pulleys being mounted onto a second shaft of the two counter-rotating shafts;
wherein the rotational movement is transferred from the engine to the two counter-rotating shafts through the two counter-rotating gears; and
wherein the rotational movement is transferred from the first shaft of the two counter-rotating shafts through the first set of shaft pulleys and transmission belts, and wherein the rotational movement is transferred from the second shaft of the two counter-rotating shafts to the second set of rotors through the second set of shaft pulleys and transmission belts, thereby rotating the plurality of the rotors of the multirotor drone.

8. The multirotor drone of claim 7, wherein the first set of rotors comprises a left rotor and a right rotor, and the second set of rotors comprises a front rotor and a rear rotor;
wherein the rotational movement is transferred from the first shaft of the two counter-rotating shafts through the first set of shaft pulleys to the left rotor and the right rotor, and wherein the rotational movement is transferred from the second shaft of the two counter-rotating shafts through the second set of shaft pulleys to the front rotor and the rear rotor, thereby rotating the plurality of the rotors of the multirotor drone.

9. The multirotor of claim 8, wherein the engine is a fuel based turboshaft engine.

10. The multirotor drone of claim 8, wherein the transmission belts comprise a front-rotor belt, a rear-rotor belt, a primary left-rotor belt, a secondary left-rotor belt, a primary right-rotor belt, a secondary right-rotor belt;
the front-rotor belt and the rear-rotor belt transfer the rotational movement from the second set of shaft pulleys to the front rotor and the rear rotor;
the primary left-rotor belt transfers the rotational movement to a set of left-rotor idlers, and the secondary left-rotor belt transfers the rotational movement from the set of left-rotor idlers to the left rotor; and
the primary right-rotor belt transfers the rotational movement to a set of right-rotor idlers, and the secondary right-rotor belt transfers the rotational movement from the set of right-rotor idlers to the right rotor.

11. The multirotor of claim 10, wherein the set of left-rotor idlers and the set of right-rotor idlers are positioned in proximity of a shaft of the front rotor.

12. A quadrotor drone comprising:
a body;
a fuel tank;
a turboshaft engine to generate rotational movement;
a gearbox assembly;
a plurality of shaft pulleys comprising a first set of shaft pulleys and a second set of shaft pulleys;
a plurality of transmission belts;
a plurality of rotors comprising a front rotor, a rear rotor, a left rotor, and a right rotor;
the gearbox assembly comprising
- a drive gear, the drive gear being connected to a shaft of the turboshaft engine;
- a pair of synchronized gears, the pair of synchronized gears are configured to counter-rotate relative to each other by a drive gear;
- a pair of synchronized shafts connected to the pair of synchronized gears, wherein when the pair of synchronized gears counter-rotate, the pair of synchronized shafts counter-rotate;

wherein rotational movement is transferred from a first shaft of the pair of synchronized shafts through the plurality of pulleys and the plurality of transmission belts to the left rotor and the right rotor, and wherein rotational movement is transferred from a second shaft of the pair of synchronized shafts through the plurality of pulleys and the plurality of transmission belts to the front rotor and the rear rotor, thereby rotating the plurality of rotors of the quadrotor drone;
wherein the first set of shaft pulleys is affixed to the first shaft of the pair of synchronized shafts, and the second set of shaft pulleys is affixed to a second shaft of the pair of synchronized shafts;
wherein rotational movement is transferred from the first shaft of the pair of synchronized shafts through the first set of shaft pulleys and the plurality of transmission belts to the left rotor and the right rotor, and wherein rotational movement is transferred from the second shaft of the pair of synchronized shafts through the second set of shaft pulleys and the plurality of transmission belts to the front rotor and the rear rotor;
wherein the plurality of transmission belts comprises a front-rotor belt, a rear-rotor belt, a primary left-rotor belt, a secondary left-rotor belt, a primary right-rotor belt, a secondary right-rotor belt;
wherein the front-rotor belt and the rear-rotor belt transfer rotational movement from the second set of shaft pulleys to the front rotor and the rear rotor;
wherein the primary left-rotor belt transfers rotational movement to a set of left-rotor idlers, and the secondary left-rotor belt transfers rotational movement from the set of left-rotor idlers to the left rotor; and
wherein the primary right-rotor belt transfers rotational movement to a set of right-rotor idlers, and the secondary right-rotor belt transfers rotational movement from the set of right-rotor idlers to the right rotor.

13. The multirotor of claim 12, wherein the set of left-rotor idlers and the set of right-rotor idlers are positioned in proximity of a shaft of the front rotor.

14. The multirotor drone of claim 12, wherein the pair of synchronized gears are configured to be coaxial.

15. The multirotor drone of claim 14, wherein the pair of synchronized shafts are configured to be coaxial.

* * * * *